United States Patent [19]
Yockey et al.

[11] Patent Number: 5,248,910
[45] Date of Patent: Sep. 28, 1993

[54] REGULATOR AND BRUSH HOLDER ASSEMBLY

[75] Inventors: Steven J. Yockey, Farmington Hills; Charlotte A. Lamb, Grosse Pointe, both of Mich.

[73] Assignee: Ford Motor Company, Dearborn, Mich.

[21] Appl. No.: 929,038

[22] Filed: Aug. 13, 1992

[51] Int. Cl.⁵ .......................................... H02K 11/00
[52] U.S. Cl. ................................... 310/68 R; 310/43; 310/71; 310/239; 310/249; 318/541
[58] Field of Search .................... 310/263, 42, 239, 43, 310/242, 71, 245, 89, 247, 249, 232, 68 R, 68 D; 318/541, 542, 538

[56] References Cited

U.S. PATENT DOCUMENTS

| | | | |
|---|---|---|---|
| 2,492,770 | 12/1949 | Stark | 310/247 |
| 3,171,050 | 2/1965 | Gordon | 310/239 |
| 3,387,155 | 6/1968 | Kruls | 310/239 |
| 3,430,084 | 2/1969 | Hall et al. | 310/50 |
| 3,454,803 | 7/1969 | Shaler | 310/245 |
| 3,496,394 | 2/1970 | Balcke | 310/239 |
| 3,518,475 | 6/1970 | Sebok et al. | 310/245 |
| 3,553,504 | 1/1971 | Balcke | 310/239 |
| 3,586,892 | 6/1971 | Sato | 310/68 R |
| 3,735,172 | 5/1973 | Battaglia | 310/239 |
| 3,983,432 | 9/1976 | Rankin | 310/242 |
| 4,366,404 | 12/1982 | Ziegler | 310/239 |
| 4,371,803 | 2/1983 | Schindel et al. | 310/242 |
| 4,389,588 | 6/1983 | Rankin | 310/242 |
| 4,404,487 | 9/1983 | Nimura | 310/239 |
| 4,504,752 | 3/1985 | Iwaki | 310/68 R |

FOREIGN PATENT DOCUMENTS 3627529 2/1988 Fed. Rep. of Germany.
3726894 2/1988 Fed. Rep. of Germany.

Primary Examiner—R. Skudy
Attorney, Agent, or Firm—Roger L. May; Paul K. Godwin, Jr.

[57] ABSTRACT

A regulator and brush holder assembly having a regulator assembly attachable to an alternator adjacent to the alternator's slip rings and a housing attached to the regulator assembly. The housing has a brush holder portion and a regulator compartment enclosing the regulator circuit of the regulator assembly. The brush holder portion has a pair of spatially separated brush holder compartments and a pigtail chamber associated with each brush holder. The associated brush holder compartments and the associated pigtail chambers have an open end and a closed end and are connected by a slot. Brush terminals are attached to the housing and extend into the open end of the pigtail chambers. A carbon brush is slidably received in each brush holder cavity and its pigtail connection is connected to the associated brush terminal through the slot. A coil spring engages the internal end of each carbon brush and produces force urging the carbon brushes away from the closed end of the brush holding compartment into sliding contact with the slip rings.

10 Claims, 2 Drawing Sheets

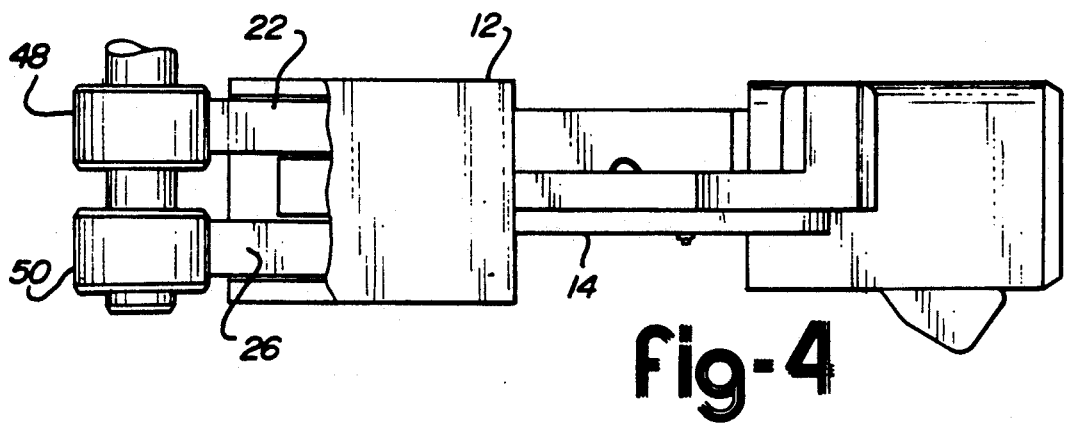
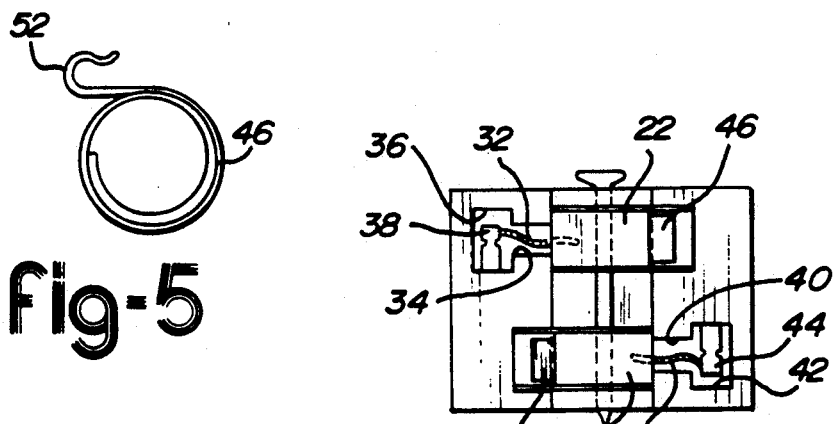
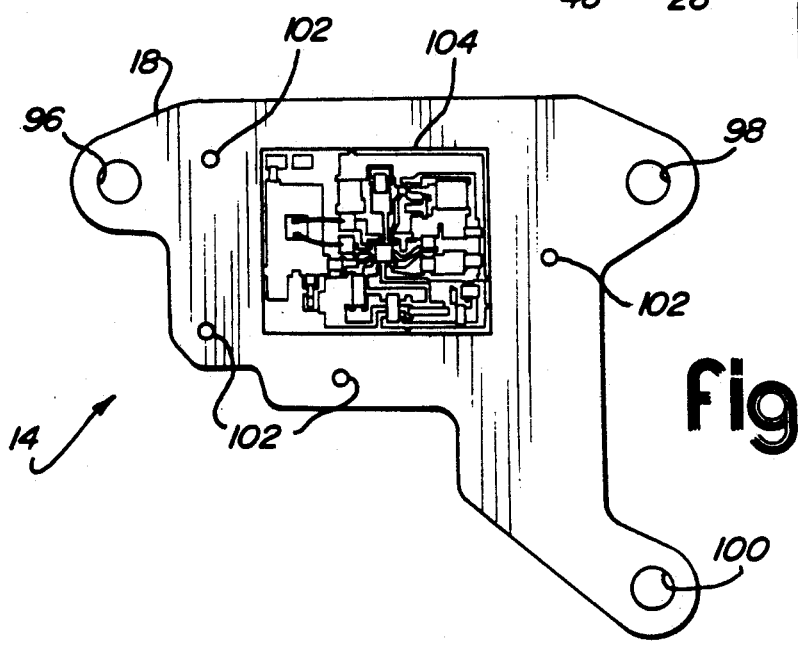

REGULATOR AND BRUSH HOLDER ASSEMBLY

FIELD OF THE INVENTION

The invention is related to the field of alternators for generating electrical power and in particular to a regulator and brush holder assembly attachable to the alternator frame which controls the output voltage of the alternator.

BACKGROUND ART

Alternators are commonly used as a source of electrical power in automotive vehicles, boats, aircraft, and various other applications. One of the problems associated with these alternators is the contamination of the carbon brushes which slidingly contact the slip ring of the alternator. In most applications, these brushes are exposed to water, salt, and other contaminants Within the engine compartment of the vehicle.

Another problem is that helical springs are used to bias the carbon brushes in sliding contact with the alternator slip rings. The force produced by these helical springs is variable as a function of their extension. As a result, the force produced by the helical springs on a new carbon brush is greater than necessary to ensure that after wear of the brush and the extension of the helical spring, the force remains sufficient to maintain the brushes in contact with the slip rings. This excessive force increases the wear on the carbon brushes and reduces their life expectancy.

Another problem faced with existing alternator brush holders is during assembly in which the pigtail connection from the brush to an electrical terminal has to be threaded through a small hole. This is a time consuming assembly task. Additionally, the small hole through which the pigtail is inserted needs to be sealed with an epoxy to inhibit contamination by water, salt and other undesirable elements.

The brush holder device taught by Nimura in U.S. Pat. No. 4,404,487 is representative of brush holders currently in use. This brush holder device has helical springs biasing the carbon brushes in sliding contact with the slip rings of the alternator and the connector pigtails are inserted into a hole provided in the terminal plate and soldered thereto.

Koster, in German patents DE 3627529 and DE 3726894 discloses a brush holder where the pigtail is attached to a terminal at the front of the holder. Like Nimura, the brush holder disclosed by Koster has a helical spring biasing the carbon brush against the slip rings.

The invention is a regulator and brush holder assembly directed toward the elimination of these problems.

SUMMARY OF THE INVENTION

A regulator and brush holder assembly for an alternator having a regulator assembly and an attached molded plastic housing. The molded plastic housing has a pair of brush holder compartments which slidably receive a pair of carbon brushes. The brush holder compartments are open at the end facing the slip rings of the alternator and closed at the opposite end. The carbon brushes are biased into slipping contact with the slip rings of the alternator by an associated coil spring. Each coil spring has a coiled portion disposed between the carbon brush and the closed end of the brush holder compartment and a U-shaped hook which engages a lip provided adjacent the open end of the brush holder compartment. The coil spring producing a uniform force biasing the brushes against the alternators slip rings independent of the wear of the carbon brushes. The housing also has a pigtail chamber adjacent to each of the brush holder compartments and a slot connecting the brush holder compartment with its associated pigtail chamber. The carbon brushes pigtail connector passes through the slot into the pigtail chamber and is connected to a terminal disposed in the pigtail chamber adjacent to the open end of the brush holder compartment.

The housing also has an enclosed two prong male input connector connectable to the vehicle's battery and the output of the alternator, a regulator housing enclosing the electrical components of the regulator assembly and embedded electrical leads connecting the brush terminals to the regulator circuit and the output connector.

The advantages of the regulator and brush holder assembly is that the ends of the brush holder compartments and the associated pigtail chambers opposite the slip rings are closed to prevent water, salt and other contaminants from the brushes, the pigtail connection and the electrical connection of the pigtail to the electrical terminal.

Another advantage of the disclosed regulator and brush holder assembly is that the coil springs produce a uniform force on the carbon brushes eliminating excessive loads which reduce brush wear and results in increased durability and reliability.

A still further advantage is the terminal to which the brush's pigtails are electrically connected is located adjacent to the open end of the brush holder compartment eliminating the need to thread the pigtail through a small hole during assembly and eliminating the need to seal the hole with an epoxy or other sealing material.

These and other advantages of the regulator and brush holder assembly will become apparent from a reading of the specification in conjunction with the drawings.

BRIEF DESCRIPTION OF THE DRAWINGS

FIG. 4 is a side view of the regulator and brush holder showing the engagement of the carbon brushes with the alternator's slip rings;

FIG. 5 is a side view of the coil spring in its relaxed state;

FIG. 6 is a partial front view showing the creative locations of the carbon brushes and the terminals; and FIG. 7 is a plan view of the regulator assembly.

DETAILED DESCRIPTION OF THE PREFERRED EMBODIMENT

Figure 1:
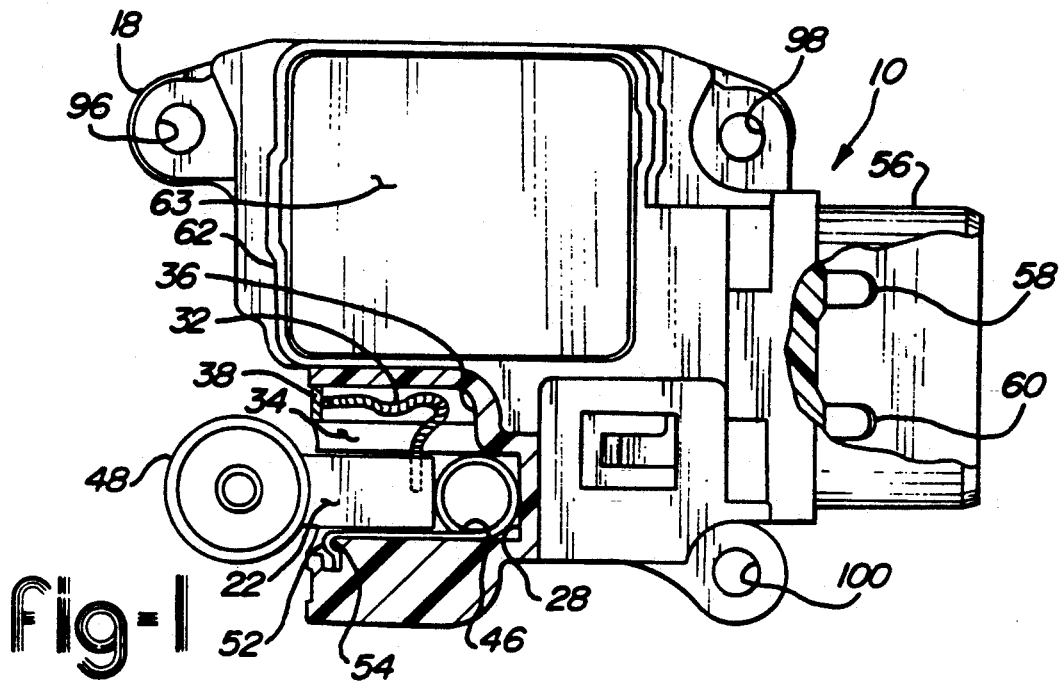
FIG. 1 is a top view of the regulator and brush holder assembly.

The details of the regulator and brush holder assembly are shown in FIGS. 1 through 4. The regulator and brush holder assembly 10 has a molded plastic housing member 12 and a regulator assembly 14. The housing member 12 is attached to regulator assembly 14 by a set of posts 1 6 Which pass through a corresponding set of apertures 102 provided through the metal base plate 18 of the regulator assembly 14. The heads of the posts 16 are swaged to secure the housing member 12 to the regulator assembly 14.

The housing member 12 has a pair of side-by-side brush holder compartments 20 and 24 which house a pair of spatially separated carbon brushes 22 and 26. The internal ends 28 and 30 of the brush holder compartments 20 and 24, respectively, are closed and protect the brushes 22 and 26 and their associated braided copper wire pigtail shunts such as pigtail shunt 32 from exposure to water and salt. A corresponding pigtail shunt (not shown) is connected to the end of carbon brush 26.

The pigtail shunt 32 passes through a slot 34 provided between the brush holder compartment 20 and a pigtail compartment 36 and has its end connected to a terminal 38 provided at the open end of the pigtail compartment 36. Like the brush compartment 20, the internal end of the pigtail compartment 36 is closed to protect the pigtail shunt 32 and the terminal 38 from water and salt. In a like manner, the pigtail shunt 32 of carbon brush 26 passes through a slot 40 between the brush compartment 24 and an associated pigtail compartment 42 and is connected to a terminal 44 as shown in FIG. 6.

The carbon brushes 22 and 26 are biased by a coil spring, such as coil spring 46, into sliding contact with the slip rings 48 and 50, respectively, of an alternator 106 to which the regulator and brush holder assembly is attached. Each of the coil springs 46 have a U-shaped catch 52 provided at one edge which engages a lip 54 provided adjacent the open end of the brush housing compartments 20 and 24 on the side opposite the associated pigtail compartments. The coiled face of the coil spring 46 engages the internal end of the carbon brushes 22 and 24 and produces a constant force such that the load on the brushes will be constant regardless of the extension of the coiled springs 46. The constant force produced by the coil springs 46 reduces wear of the carbon brushes and increases durability. A side view of the coil spring 46 in its relaxed state is shown in FIG. 5.

The molded plastic housing member 12 also also incorporates shielded two-prong connector 56 having two male connector elements 58 and 60 through which electrical power from the battery and/or the alternator is delivered to the regulator assembly 14. As is known in the art, the regulator circuit mounted on the regulator assembly will regulate to the electrical power being supplied to the rotor of the alternator so as to maintain the output voltage of the alternator independent of the electrical load.

The molded plastic housing member 12 also has a regulator compartment 62 which houses the electrical components of the regulator circuit mounted on the base plate 18. The regulator compartment has a removable cover 63 which is removed to make the soldered electrical connections between the regulator circuit and the regulator circuit contacts 64, 70, 74, 80 and 84. After the electrical connections are made, the cover 63 is snapped in place enclosing the top of the regulator compartment 62. The details of the regulator assembly are shown in FIG. 7.

Figure 2:
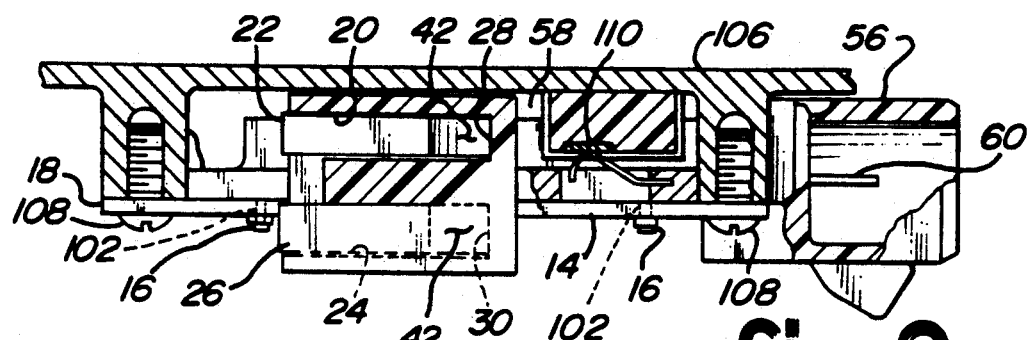
FIG. 2 is a side view of the regulator and brush holder assembly.
Figure 3:
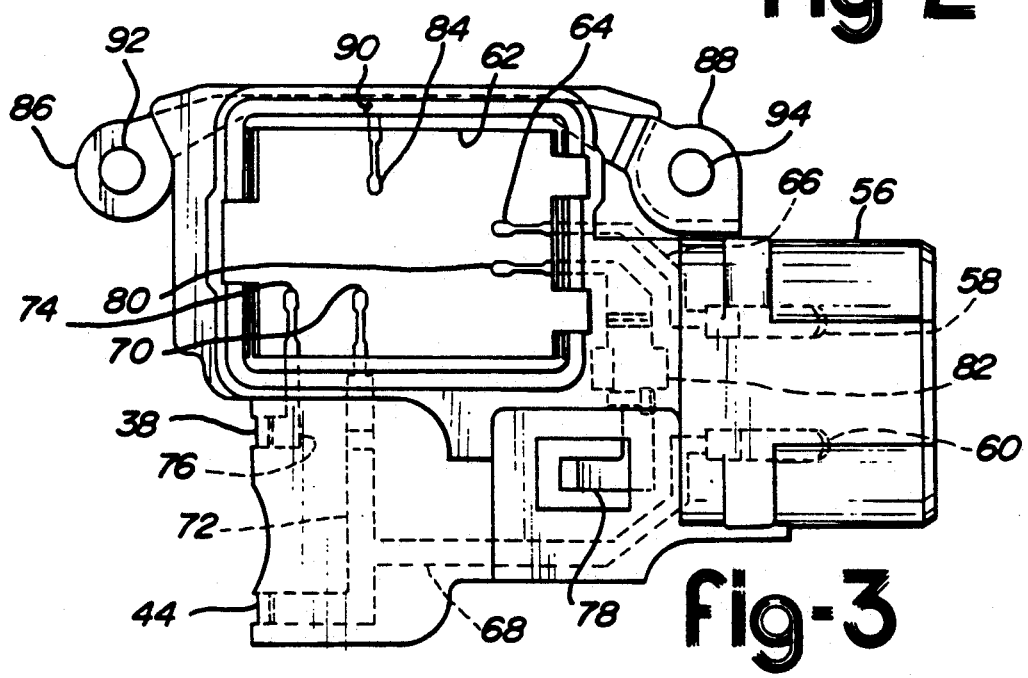
FIG. 3 is a top view of the molded plastic housing showing the location of the internally molded leads and terminals.

FIG. 3 shows leads embedded within the molded plastic housing member 12 which connect the male connector elements 58 and 50 to the regulator circuit and the terminals 38 and 44. In FIG. 3, the cover is removed to show the internal structure of the regulator compartment 62. Male connector element 58 is connected to a regulator circuit contact 64 within the regulator compartment 62 via electrical lead 66 while male connector element 60 is connected to the brush terminal 44 via lead 68 and to a regulator circuit contact 70 within the regulator compartment 62 via lead 72. The brush terminal 38 is connected to the regulator circuit contact 74 via lead 76. The alternator sense contact 78, which contacts the alternator sense output 110 mounted on the frame of the alternator 106 senses the failure of the alternator to output electrical power, is connected to regulator circuit contact 80 via lead 82. The alternator sense contact 78 automatically contacts the alternator sense output 110 when the regulator and brush holder assembly is mounted on the alternator as shown in FIG. 2. A regulator circuit contact 84 is connected to a pair of ground terminals 86 and 88 by internal lead 90. The ground terminals 86 and 88 contact the base plate 18 when the housing member 12 is mounted to the regulator assembly 14. The holes 92 and 94 of the ground terminals 86 and 88 align with the mounting holes 96 and 98 provided in the base plate 18.

The details of the regulator assembly are shown in FIG. 7. The base plate 18 has three mounting holes 96, 98 and 100 by means of which the regulator and brush holder assembly 10 is attached to the alternator 106 as shown in FIG. 2 such as screw 108 using threaded fasteners. The base plate 18 also has a plurality of through apertures 102 through which are received the posts 16 as previously described. A regulator circuit board 104 containing the regulator circuit is bonded to the base plate 18 such that the regulator circuit 104 is received in the regulator compartment 62.

Having described the regulator and brush holder assembly with regard to a specific configuration shown in the drawings, it is recognized that those skilled in the art may make changes or improvements thereto within the scope of the invention set forth in the appended claims.

We claim:

1. A regulator and brush holder assembly for an alternator having a motor and slip rings, said regulator regulating electrical power supplied to said rotor, said regulator and brush holder comprising:

a regulator assembly mountable to the alternator, said regulator assembly having a regulator circuit for regulating the electrical power supplied to the rotor of the alternator;

a housing member attached to said regulator assembly, said housing member having a regulator compartment enclosing said regulator circuit, a brush holder portion and an input power connector, said brush holder portion having a pair of side-by-side brush holder compartments having an open end and a closed end, a pigtail chamber associated with each of said brush holder compartments, said pigtail chambers being disposed on one side of each brush holder compartment, each pigtail chamber having an open end adjacent to said open end of said brush holder compartment and a closed end, a brush terminal provided adjacent to said open end of each pigtail chamber, a longitudinal slot connecting each pigtail chamber with its associated brush holder compartment;

a spring mounting lip provided adjacent to said open end of each brush holder chamber on a side opposite said pigtail chamber;

a carbon brush slidably received in each brush holder compartment, said carbon brush having a pigtail connector passing into said pigtail chamber through said longitudinal slot and connected to said brush terminal;

a coil spring disposed in each of said brush holder compartments, each coil spring having a coiled portion at one end and a catch provided at an opposite end, said coiled portion engaging ends of said carbon brushed facing said closed end and said catch connected to said mounting lip at said open end of said brush holder compartment, said coil spring biasing said carbon brushed away from said closed end and into sliding contact with the slip rings of the alternator with a uniform force independent of the wear of said carbon brushes;

electrical leads embedded in said housing member connecting said input power connector to said regulator circuit and said regulator circuit to said brush terminals.

2. The regulator and brush holder assembly of claim 1 wherein said housing member further comprises an alternator sense contact terminal and an embedded electrical lead connecting said alternator sense contact terminal to said regulator circuit, said sense contact terminal automatically connected to an output of said alternator upon mounting of said regulator brush holder assembly to the alternator.

3. A regulator and brush holder assembly for an alternator having a rotor and two slip rings by means of which electrical power is supplied to said rotor, said regulator and brush holder assembly comprising:

a regulator assembly attachable to said alternator, said regulator assembly having a base plate and a regulator circuit mounted on said base plate;

a molded plastic housing attached to said base plate, said molded plastic housing having a regulator compartment enclosing said regulator circuit and a brush holder portion, said brush holder portion having two spatially separated brush holder compartments, an associated pigtail chamber associated with each brush holder compartment and connected thereto by a longitudinal slot, said brush holder compartment and pigtail chambers having a closed end and an open end;

a brush terminal disposed adjacent to said open end of each pigtail chamber;

a carbon brush slidably disposed in each brush holder compartment, said carbon brush having a pigtail lead slidably passing through said longitudinal slot and connected to said brush terminal of said associated pigtail chamber;

a coil spring disposed in each brush holder compartment biasing said carbon brushes in a direction away from said closed end of said brush holder compartment into sliding engagement with said slip rings when said regulator and brush holder assembly is mounted on the alternator; and electrical connectors molded into said molded plastic housing connecting said brush terminals to said regulator circuit.

4. The assembly of claim 3 wherein said coil spring has a coiled portion engaging an end of said carbon brush internal to said brush holder compartment and a clip provided at an end opposite said coiled portion attachable to said housing adjacent to said open end of said brush holder compartment.

5. The assembly of claim 3 wherein said molded plastic housing further comprises:

a sense contact terminal; and an electrical lead molded in said housing connecting said sense contact terminal to said regulator circuit.

6. The assembly of claim 3 further comprising an electrical connector for providing electrical power to said regulator circuit from an external source.

7. A brush assembly comprising:

a molded plastic housing having a pair of spatially separated brush holding compartments, a pigtail chamber adjacent to and associated with each of said pair of spatially separated brush holding compartments and a connecting slot connecting each of said brush holding compartments with its associated pigtail chamber, each of said brush holding compartments and said pigtail chambers having a closed end and an open end, said open ends of said brush holding compartments and said pigtail chambers facing in a same direction;

an electrical brush terminal associated with each pigtail chamber, each brush terminal attached to said housing and extending into said open end of its associated pigtail chamber;

a carbon brush slidably received in each of said brush holder compartments, each carbon brush having a pigtail lead extending through said connecting slot into said associated pigtail chamber and connected to said brush terminal extending into said open end of said associated pigtail chamber; and a coil spring disposed in each of said brush holding compartments, said coil spring engaging an end of said carbon brush adjacent to said closed end of said brush holding compartment to produce a force urging said carbon brush away from said closed end.

8. The brush assembly of claim 7 wherein said coil spring has a coiled portion at one end engaging said carbon brush and a catch provided at its opposite end engaging said housing adjacent to said open end of said brush holder compartment.

9. The brush assembly of claim 8 wherein said catch engages said housing on a side of each of said brush holder compartments opposite said pigtail chamber.

10. The brush assembly of claim 8 further comprising a regulator attached to said housing, said housing has electrical leads molded therein connecting said brush terminals to said regulator.

* * * * *